May 26, 1942. G. DITTMANN 2,284,562
MIRROR REFLEX CAMERA WITH BINOCULAR EYE LEVEL VIEW FINDER
Filed Nov. 26, 1940 3 Sheets-Sheet 1

Inventor
Georg Dittmann
By Clarence A. O'Brien
Attorneys

May 26, 1942.    G. DITTMANN    2,284,562
MIRROR REFLEX CAMERA WITH BINOCULAR EYE LEVEL VIEW FINDER
Filed Nov. 26, 1940    3 Sheets-Sheet 2

Inventor
Georg Dittmann
By Clarence A. O'Brien
Attorney

Inventor
Georg Dittmann
By Clarence A. O'Brien
Attorney

Patented May 26, 1942

2,284,562

UNITED STATES PATENT OFFICE 2,284,562

MIRROR REFLEX CAMERA WITH BINOCULAR EYE LEVEL VIEW FINDER

Georg Dittmann, Los Angeles, Calif.

Application November 26, 1940, Serial No. 367,271

1 Claim. (Cl. 95—42)

This invention relates to cameras with binocular eye level view finders, the general object of the invention being to provide a binocular finder wherein a pair of images of the object is produced by one lens with means for reflecting the images to the eye pieces in erect position and with correct sides, with the viewer looking straight toward the object and the whole ground glass image of the object permanently magnified for exact focusing.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which.

Figure 1:
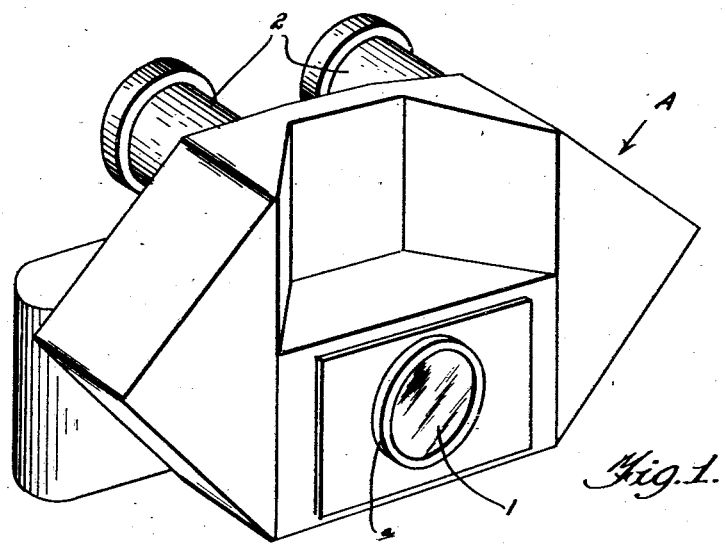
Figure 1 is a perspective view of a miniature camera constructed in accordance with this invention.
Figure 2:
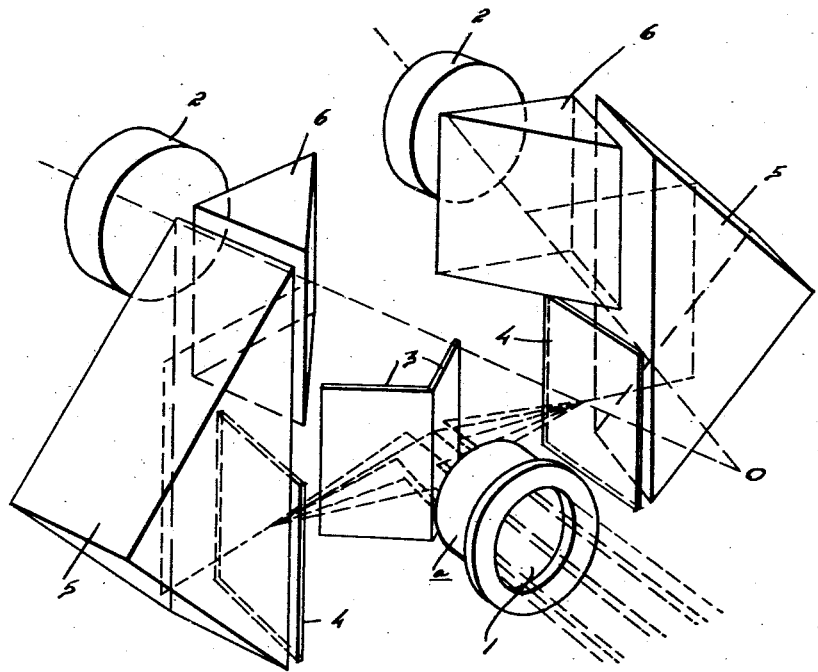
Figure 2 is a perspective diagrammatic view of the invention.

In these drawings the letter A indicates a camera which is provided with the lens barrel $a$ in its front containing the lens 1 and while the camera is shown as a miniature camera using a movie film it will, of course, be understood that the invention can be used for other types of camera.

In carrying out the invention I provide a pair of eye pieces 2 and a pair of mirrors 3 is placed in the camera in rear of the lens and these two mirrors are held in the shape of a V with its apex forward when the finder is in operative position. These mirrors are hinged at their rear edges and suitable means are provided for moving the mirrors out of the path of the light beam when a picture is to be taken and suitable means are provided for adjusting the eye pieces to the distance between the eyes of the user. A pair of ground glasses 4 or the like is arranged in the camera, one at each side of the mirror arrangement so that the light rays reflecting from these mirrors will be thrown upon the glasses 4.

As will be seen the light beam passing through the lens 1 strikes the two mirrors which splits the beam into two parts with one part being reflected on one ground glass and the other part on the other ground glass and the distance between the mirrors and ground glasses is so that the rays meet on the surfaces of the ground glasses, thus producing two images of the subject, one on each of the ground glasses. The two sets of prisms 5 and 6, of the shape shown, reflect the ground glass images to the two eye pieces 2, which are furnished with suitable magnifying glasses, and simultaneously turn the images upright with correct sides, causing this complete reversal of the images in the same way that prisms work in a fieldglass. The result is that the images seen through the eye pieces are in correct relative position, being correct as from right and left and being erect. The position of the two sets of prisms is so that the two reflected ground glass images seen through the eye pieces, merge in a point O in front of the camera, forming one upright, magnified image, seen with both eyes. Although each eye sees a separate image, similar to a stereoscope, there is no stereoscopical effect, because both images are produced by the same lens and, therefore, seen from the same point.

Figure 7:
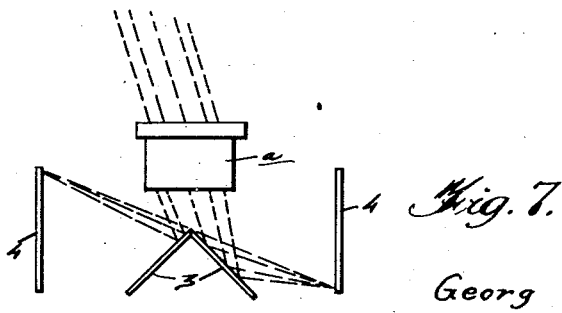
Figure 7 is a partial diagrammatic top plan view showing what happens if the rays of light come from a point on the margin of the picture area.

Figures 2, 3, 4 and 5 show how a bundle of rays, or a beam, originating from a distant point in the axis of the lens, is divided by the mirrors in two equal parts. However, if the rays come from a point on the margin of the picture area then the beam is divided into two unequal parts as shown in Figure 7. Thus one ground glass shows the image of the distant point a little brighter than the other one. The result is, that the brightness of both ground glass areas is gradually decreased from one side to the other, but since on one ground glass the right side is brighter and on the other one the left side, the brightness of the final image, consisting of both images, is equal over the whole area of the ground glass.

Figure 6:
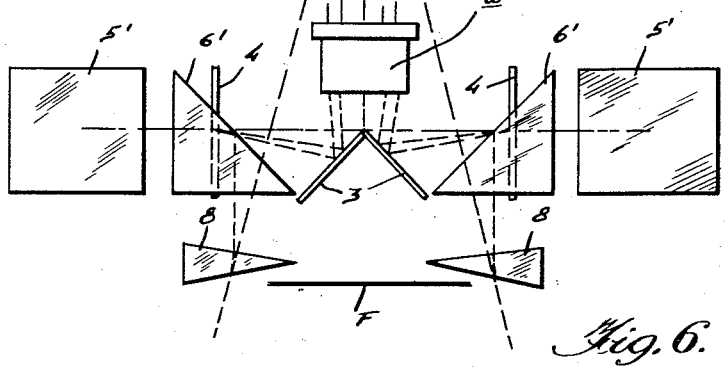
Figure 6 is a diagrammatic top plan view showing a modified form of the invention.

Figure 6 shows a modified form of the invention. In this figrure the two sets of prisms 5' and 6' are arranged rectangularly relative to the ground glasses so that the rays finally coming out of the prisms will run parallel to each other, forming two separate images as seen from behind the camera. In order to blend the two images together to a single image the well known principle of the stereo viewer is applied. Two prisms 8 are used which refract the rays so that the images merge in a point O in front of the camera. In order to magnify the final image it is only necessary to put convex lenses before the prisms 8 or to use two halves of a convex lens instead of the prisms as usual in stereo viewers.

Figure 3:
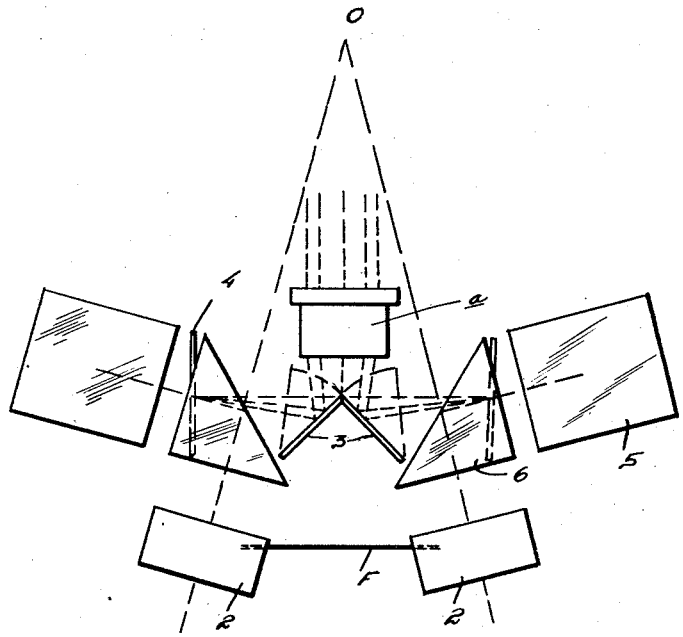
Figure 3 is a diagrammatic top plan view.
Figure 4:
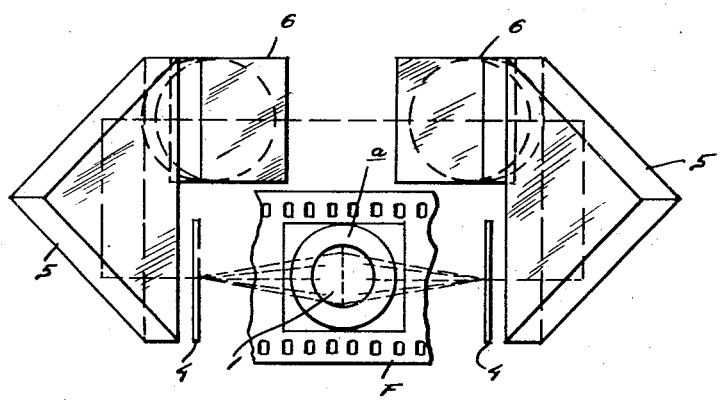
Figure 4 is a front view.
Figure 5:
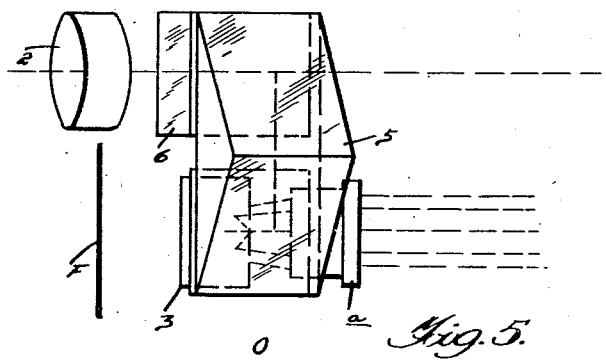
Figure 5 is a side view of Figure 4.

As before stated, at the moment of exposure the two mirrors are swung out of the way as shown in dotted lines in Figure 3 so that the light rays can pass to the film or sensitized medium F. Any suitable means can be used for moving the mirrors and this is a known principle used in all single lens reflux cameras though in such cameras only one mirror is used.

Thus I have provided simple means whereby the viewer uses both of his eyes and looks straight ahead and he sees the image of the subject in a natural position, that is, with the image upright and with correct sides and the whole image is magnified. Interchangeable lenses can be used with the invention without special accessory, and no parallax adjustment is necessary. Also, all disturbing light from the exterior of the camera is excluded from the ground glasses.

The diagrammatic views in the drawings show the course taken by the light rays when acted upon by the parts of the invention.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In a mirror refluex camera having a lens, a pair of upright ground glasses in the camera spaced apart and paralleling each other and also paralleling the path of the light beam which passes between the glasses, a pair of vertically arranged mirrors in the camera and located between the glasses with the mirrors arranged in V-shape with the apex toward the lens, said mirrors dividing the beam into two parts and reflecting the two parts upon the glasses, a pair of eye pieces at the top of the camera paralleling each other, said eye pieces extending horizontally and toward the front of the camera with the eye receiving parts at the rear ends, whereby the viewer is enabled to look throught the eye pieces toward the subject and prisms in the camera for reflecting the images from the ground glasses to the eye pieces in erect position and correct relative positions for right and left.

GEORG DITTMANN.